United States Patent Office 3,455,787
Patented July 15, 1969

3,455,787
PROCESS FOR EXTRACTING BROMELAIN
Nicolas Makay, P.O. Box 486, Mayaguez,
Puerto Rico 00708
No Drawing. Filed Apr. 29, 1966, Ser. No. 546,177
Int. Cl. C12d 13/00
U.S. Cl. 195—66                    3 Claims

ABSTRACT OF THE DISCLOSURE

A process for producing bromelain from the stems of pineapple plants which includes grinding the stems and removing the liquid therefrom by pressing, and centrifuging the liquid to precipitate fine ice crystals following which the remaining liquid can be centrifuged. Preferably precipitants (organic solvents, salts) and a detergent soluble in the precipitant are present during cooling.

---

This invention relates to the production of bromelain and especially the production thereof from the stems of pineapple plants.

It has been found that the stem or stump of a pineapple plant is the source of an enzyme. Various methods have been suggested for extraction of the enzyme from the pineapple plant but these have not been completely satisfactory for various reasons. One of the principal problems is that of obtaining as much of the enzyme fluid as possible in the process of extraction from the stem. The proteins recovered by conventional precipitation techniques have not had satisfactory color, stability or activity and have been too expensive.

The principal object of the present invention is to provide a process for extracting more of the enzymes from the stems than was possible in prior processes and more economically.

The present process uses ripe pineapple stems. The stems have the extraneous growths removed therefrom by cleaning with a brush or other suitable means. They then can be ground with a suitable food chopper, passing the same through a blade with holes therein. The liquid or fluid then can be pressed from the fine pulp in a suitable press. The liquid thus obtained will be turbid and it is centrifuged so as to precipitate the water as fine ice crystals, following which the remaining liquid can be centrifuged or filtered.

One method of carrying this out is to refrigerate the clear liquid by immersing in a vessel while stirring in a salt and crushed ice bath. Other refrigerating means can be used. Following this, a precipitation agent may be employed to remove the enzymes or enzyme mixture. Suitable precipitants may include dielectric water soluble organic solvents such as ethyl alcohol, acetone, methyl ethyl ketone, methanol, isopropanol, and water soluble salts such as ammonium sulfate or sodium chloride. In another aspect, a detergent soluble in the precipitating agent can be added. It can be theorized that the bromelain traces adhere to the water crystal surfaces and are removed quantitatively. One example of such a detergent is sulfonate ricinoleic acid. Other examples are fatty alcohols with more than six (6) carbon atoms or mixtures thereof.

The precipitated bromelain is then separated, for example, in a centrifuge, and dried. It has been found that the majority of bromelain in the liquid remained in the water after eliminating a high percentage of the water content as ice crystals.

EXAMPLE I 11 kilograms of pineapple stems, after having been washed and cleaned with a brush, were ground with a food chopper, passing the same through a plate with half inch holes. The fine pulp then was pressed in a hydraulic press and 5.8 liters of liquid were collected.

The turbid liquid was centrifuged and from the resultant clear liquid, 1,000 milliliters were refrigerated while being stirred in a salt and crushed ice bath, until 0.9 of the water was precipitated as fine ice crystals. The remaining liquid was centrifuged.

After adding 450 milliliters of concentrated ethyl alcohol, the bromelain was precipitated, centrifuged and dried at 40° C.

From the original liquid, before refrigeration, 100 milliliters were treated with 450 milliliters of concentrated ethyl alcohol and the precipitated bromelain was separated in a centrifuge and dried at a temperature of 40° C. The first precipitate's weight after drying was 4.5 grams, the second precipitate's weight was 0.6 gram. Such shows that the major part of bromelain of the liquid remained in the water after eliminating 0.9 of the water content as ice crystals.

The bromelain was tested with the milk-clotting method of Balls, Thompson and Kies after activation with 1% of "Varsene."

The two products had the same activity.

EXAMPLE II

The same procedure was used as set forth in Example I, except that during refrigeration, a detergent sulfonated ricinoleic acid was added. The yield of bromelain after precipitation was 6.2 grams, compared with the bromelain of the original liquid of 0.6 gram. Thus, it can be seen that the yield of bromelain was increased by the use of a detergent.

The milk-clotting properties of the two products were found to be the same as in Example I.

EXAMPLE III

The same procedure was used as set forth in Examples I and II except that during refrigeration, a commercial detergent with the commercial name of "Antarox," a trademark of General Aniline and Film Co., was used. This detergent is believed to be made of fatty alcohols. The yield after precipitation was 6.1 grams, compared with the original liquid of 0.6 gram. This yield is practically identical with Example II.

The milk-clotting properties of the products were found to be the same as in Example I.

EXAMPLE IV

The same procedure was used as set forth in Examples I and II except that for activation Cystine L- was used. The milk-clotting properties of the product were only 92% of those obtained in Example I.

EXAMPLE V

The same procedure was used as set forth in Examples I and II except, that for activation, NaCN (1%) was used. The milk-clotting properties of the product were found to be 95% of those obtained in Example I.

It should be evident that variations may be made in details of the process without departing from the spirit of the invention except as defined in the appended claims.

What is claimed is:

1. A process for producing bromelain comprising grinding pineapple stems to produce a fine pulp, applying pressure to said pulp to obtain a fluid, cooling said fluid and precipitating water as fine ice crystals and to leave liquid containing bromelain, adding a precipitating agent to said liquid to precipitate the bromelain therein, wherein detergent soluble in the precipitating agent is present during cooling, and then separating the bromelain from the liquid.

2. The process according to claim 1 wherein the precipitating agent is selected from the group consisting of acetone, methyl ethyl ketone, methyl alcohol, ethyl alcohol, propyl alcohol, and ammonium sulfate.

3. The process according to claim 1 wherein the detergent is sulfonated ricinoleic acid.

References Cited

UNITED STATES PATENTS

| | | | |
|---|---|---|---|
| 2,343,169 | 2/1944 | Burkhart | 99—205 |
| 2,657,555 | 11/1953 | Wenzelberger | 99—205 X |
| 3,002,891 | 10/1961 | Heinicke | 195—66 |

LIONEL M. SHAPIRO, Primary Examiner